April 25, 1961     R. B. RANSOM     2,981,127

DRILL WITH CHIP REMOVER

Filed Sept. 23, 1959

INVENTOR.
ROBERT B. RANSOM
BY
Barlow & Barlow
ATTORNEYS

United States Patent Office 2,981,127
Patented Apr. 25, 1961

2,981,127
DRILL WITH CHIP REMOVER

Robert B. Ransom, Westerly, R.I., assignor to Norfolk Products Corporation, a corporation of Connecticut Filed Sept. 23, 1959, Ser. No. 841,760

1 Claim. (Cl. 77—67)

This invention relates to a drill of the type which may be used for making holes in either wood or metal.

Drills for making a hole usually cut at their end and provide chips of a powder-like or fine granular size as the drill enters the material in which the hole is being made. The drill usually has some sort of a guide path for the passage of the removed material and the chips frequently become compressed along this guide path in somewhat of a briquetted form and frequently when the drill is removed from the hole after the drilling is complete, the chips will remain in the hole, and it is difficult to remove them.

One of the objects of this invention is to provide a means for removing the chips with the drill as the drill is removed from the hole.

Another object of the invention is to provide a removing means for the chips by the shaping of the drill.

A more specific object of the invention is to provide such an interruption in the chip guide surface of the drill in a simple and inexpensive manner.

A still more specific object of the invention is to provide some sort of an abutment or interruption in the surface along which the chips are guided so as to enable the chips to get a sort of hold on this portion of the drill, and thus when the drill is removed from the hole, the chips will come with it.

With these and other objects in view, the invention consists of certain novel features of construction as will be more fully described and particularly pointed out in the appended claim.

In proceeding with this invention, the drill used may be of many different forms which will have a shank with a cutting end, and adjacent this cutting end, there will be provided some interruption in the path which is provided for the chip removal; such for instance, as a barb raised from the surface which will enable the chips to slide over the barb as they are forced away from the cutting edge but which will be gripped by the barb when the drill is removed so as to pull the chips out of the hole.

Figure 1:
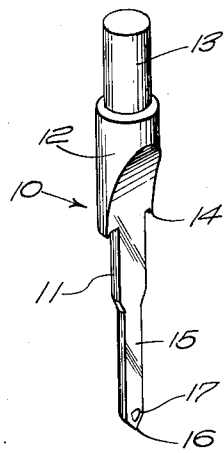
Figure 1 is a perspective view of a drill equipped with this invention.

In Fig. 1 a drill is shown designated generally 10 which has a semi-cylindrical shank 11, an enlarged portion 12 and a chuck gripping end 13. The enlarged portion 12 is so shaped at its edges 14 as to provide for the formation of a hole for the head screw. The shank 11 is semi-circular in cross-section providing a flat surface 15 which is a guiding path extending from the cutting end 16 along which the chips, as they are formed at the end 16, may pass as the drill is rotated and moved into the hole which it forms in the work.

Figures 7, 8:
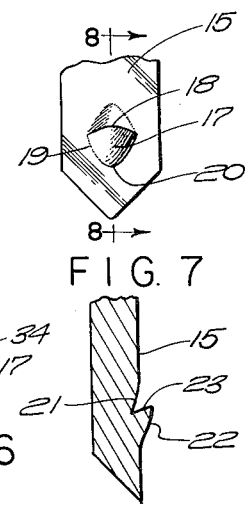
Figure 7 is an elevational view illustrating in a greatly enlarged scale the barb which is formed in the chip guide path of the drill.
Figure 8 is a sectional view on line 8—8 of Fig. 7.

On this surface 15 and adjacent the cutting end 16, I have provided an interruption in the surface by raising some of the material of the drill so that it extends outwardly from the surface and which formation, in this particular case, I generally call a barb 17. The barb by itself as seen in an enlarged view, Figs. 7 and 8, is generally curved at its top as at 18 with gradually converging sides 19 while it is left joined to the face 15 as at 20. In the formation of this barb, some of the stock is displaced or upset as at 21 leaving a recess. The outer surface of the barb at 22 will also be seen to be sloping outwardly from its portion nearest the drill cutting end 16 as it extends away from this cutting end so as to minimize resistance to the passage of chips upwardly away from the cutting edge 16. Thus, as the drill enters the hole in the work, the chips will be moved upwardly or away from the cutting edge 16 sliding over the barb 17 and usually will compact themselves by compression in the hole and against the surface 15 and be caused to rotate with the drill as the drill turns in the work. The chips are usually of a fine power-like material or in somewhat granular form and the compression causes more or less briquetting so that they will stick together providing a rather fragile core. The inner surface 23 of the barb provides an abutment so that when the drill is lifted upwardly in the hole tending to extract the drill from the hole, the briquetted mass of powder will catch back of the abutment 23 and be lifted out of the hole. In many instances the entire briquetted powdered chips will stay on the drill completing its cylindrical form along that guide path upon which they are formed.

Figure 2:
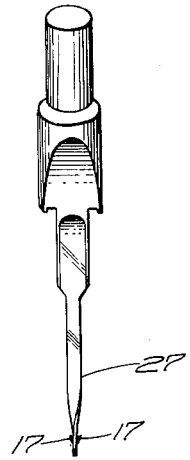
Figure 2 is a perspective view of a somewhat modified form of the drill showing two guide paths for the chips and a chip remover in each guide path.
Figure 3:
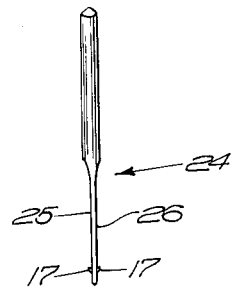
Figure 3 is a perspective view similar to Fig. 2 but showing a drill of a somewhat modified form with respect to Fig. 2.

The foregoing describes a particular type of drill having a semi-cylindrical shank. In some cases, however, the shank or drill will be cut away on both sides leaving a generally flat center shank such as shown at 24 in Fig. 3, thus providing two paths 25 and 26 for the chips to pass upwardly along the drill, and in drills of this case I will provide barbs 17 raised from both surfaces of the guide paths 25 and 26. These barbs will be similarly located adjacent the cutting end of the drill. In Fig. 2 I have illustrated a drill which is substantially the same as the drill described in connection with Fig. 3 except that its shank is twisted as at 27, thus providing a helical type of guide path. The barb 17, however is raised in both guide paths the same as described in connection with Fig. 3.

Figure 4:
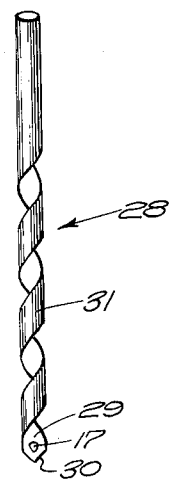
Figure 4 is a perspective view of a drill having a single guide path equipped with this invention.
Figures 5, 6:
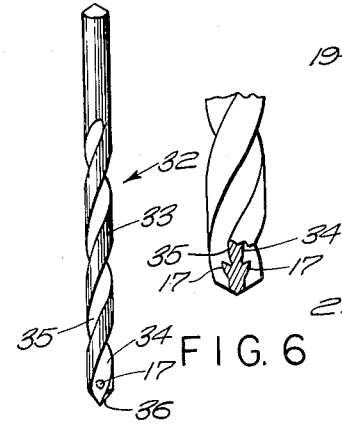
Figure 5 is a perspective view of the twist drill type having two guide paths and equipped with this invention.
Figure 6 is an enlarged elevation partly in section of Fig. 5 at right angles thereto.

In Fig. 4 I have provided a drill 28 having a helical form of guide path 29 for the chips which path extends from the cutting end 30 helically along the shank 31, and in this case a similar form of barb 17 will be raised adjacent the cutting end 30. In the form shown in Figs. 5 and 6 the drill 32 is provided with a shank 33 which is of the twist-drill type having two guiding paths 34 and 35 extending from its cutting end 36 and in this case I have raised barbs 17 in both guide paths adjacent the cutting end 17 as may be seen in Fig. 6.

Figures 9, 10:
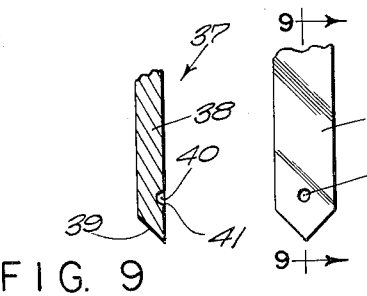
Figure 9 is a sectional view on line 9—9 of Fig. 10 of a modified form of drill.
Figure 10 is an elevational view of Fig. 9 showing an indented form of interruption in the guide surface.

In Figures 9 and 10 there is illustrated a portion of a drill 37 having a semi-circular shank 38 with a pointed end 39, and in this case instead of raising a barb I have provided a depression 40 by forcing the stock inwardly so that it provides a recess into which the powdered compressed chips may be forced as the drill is rotating, thus giving the chips a hold on the drill so that the more or less briquetted mass may be removed from the hole by its engagement as at 41 with the drill.

Figure 11:
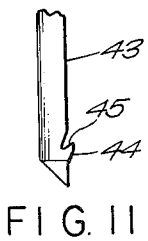
Figure 11 is a side elevational view of a drill of the type shown in Fig. 1 which has been struck with a cold chisel to provide a raised portion.
Figure 12:
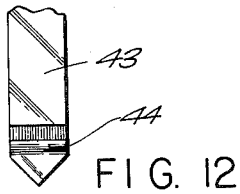
Figure 12 is a face elevational view thereof.

In Figures 11 and 12, I have provided a depression 42 extending widthwise across the chip guiding path 43 which will cause the stock to be raised slightly as at 44 by the depression which may be made with a cold chisel or some other such tool so that there will be an abutting surface 45 extending slightly from the face 43 back of which the chips may engage to be lifted from the hole as the drill is raised or withdrawn from the hole.

I claim:

A drill having a lengthwise extending shank with a cutting end, a guide path formed by a reduction in the full diameter of the shank providing a flat surface extending from said end lengthwise of said shank along which chips formed at the cutting end may pass, and an abutment raised from and interrupting the surface of the guide path and extending across the full width thereof to provide a point of holding for accumulated chips for withdrawal of the chips when the drill is withdrawn from the hole.

References Cited in the file of this patent

UNITED STATES PATENTS

| 597,750 | Smith | Jan. 25, 1898 |

FOREIGN PATENTS

| 46,955 | Germany | May 17, 1889 |
| 973,672 | France | Sept. 20, 1950 |